INVENTOR.
Raymond L. Southern
HIS ATTORNEYS

Sept. 8, 1953   R. L. SOUTHERN   2,651,668
CRUCIBLE INTERCHANGING MECHANISM
FOR ARC MELTING FURNACES
Filed June 20, 1952   5 Sheets-Sheet 3

INVENTOR.
Raymond L. Southern
BY
HIS ATTORNEYS

INVENTOR.
Raymond L. Southern

BY
HIS ATTORNEYS

Patented Sept. 8, 1953

2,651,668

UNITED STATES PATENT OFFICE 2,651,668

CRUCIBLE INTERCHANGING MECHANISM FOR ARC MELTING FURNACES

Raymond L. Southern, Troy, N. Y., assignor to Allegheny Ludlum Steel Corporation, Brackenridge, Pa., a corporation of Pennsylvania Application June 20, 1952, Serial No. 294,667

11 Claims. (Cl. 13—33)

This invention relates to the making of ingots from consumable electrodes of titanium or other difficultly reducible metallic material. In an application filed by me on February 20, 1951, Ser. No. 211,887, I disclose among other things the making of ingots in water cooled copper crucibles by the use of consumable electrodes of the metal to be reduced to ingot form.

An object of this invention is to provide a method whereby crucibles employed in the manufacture of ingots from consumable electrodes of a metal such as titanium which, while above a certain temperature, must be surrounded by an atmosphere of inert gas or be kept in a vacuum, can be quickly interchanged while in such atmosphere or vacuum.

Another object is to provide mechanism whereby crucibles employed in the manufacture of ingots from consumable electrodes of a metal such as titanium which, while above a certain temperature, must be surrounded by an atmosphere of inert gas or be kept in a vacuum, can be quickly interchanged while in such atmosphere or vacuum.

These and other objects I attain by the method and apparatus described in the specification and illustrated in the drawings accompanying and forming part of this application.

Figure 1:
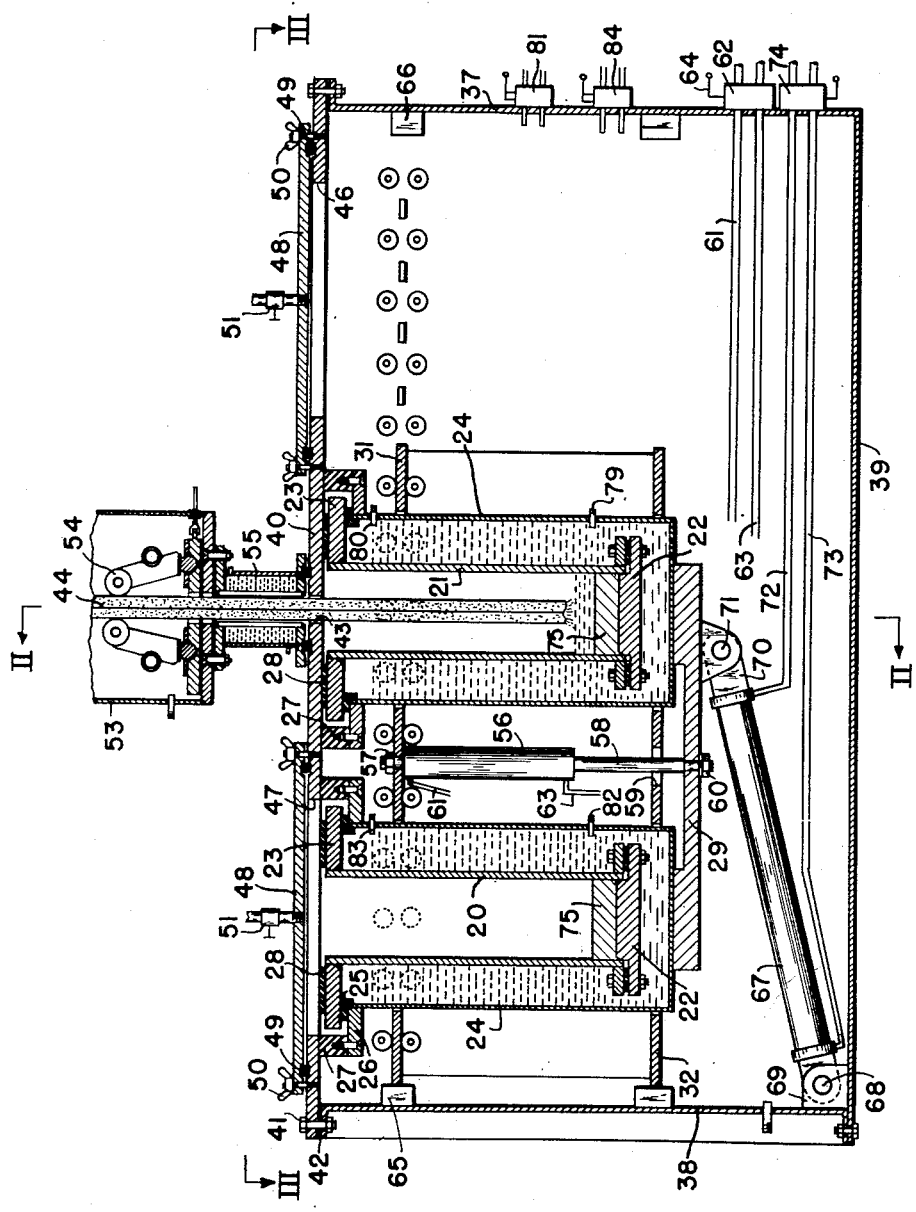
Figure 1 is a vertical sectional view of apparatus for carrying out the method of this invention.
Figure 2:
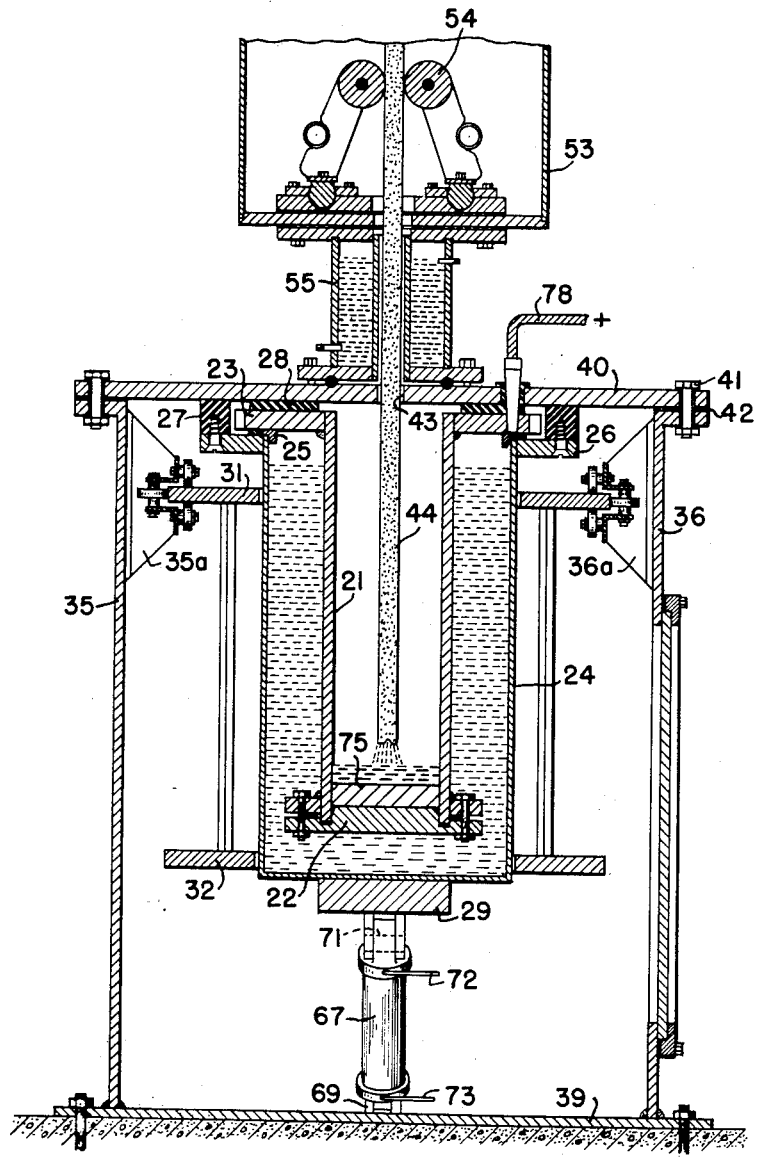
Fig. 2 is a sectional view taken on line II—II of Fig. 1.
Figure 3:
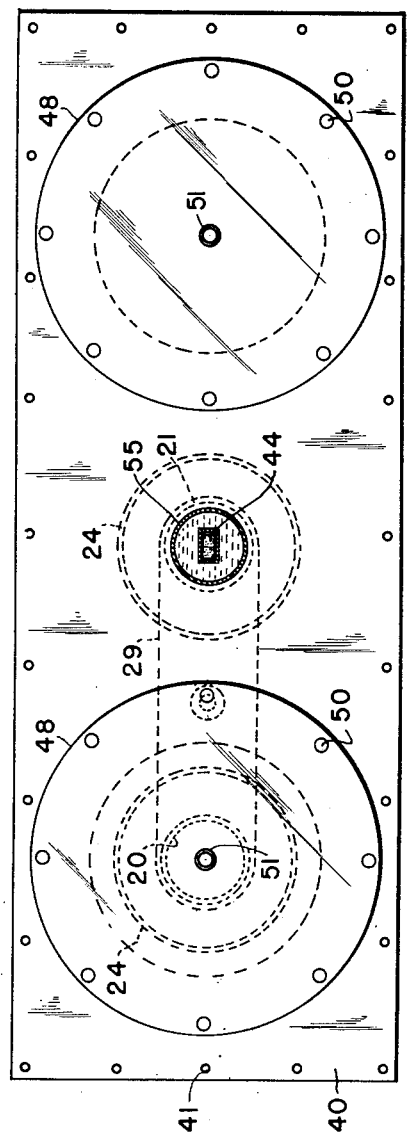
Fig. 3 is a top plan view taken from a horizontal plane which includes line III—III of Fig. 1.

Figs. 7-16 inclusive are more or less diagrammatic views in vertical section and depict the operation of the device or apparatus of Figs. 1 and 2 in carrying out the method of this invention.

In a broad sense, the device or apparatus for carrying out the method of this application comprises at least three copper crucibles and two vertically positioned cylindrical containers which serve as cooling water tanks within which two of the three crucibles at a time are suspended. The two tanks are mounted on a support member and are spaced apart by a frame which is mounted for horizontal movement within a tank-like housing which is arranged to be evacuated and flooded with an inert gas.

This housing is of a length such as would accommodate three crucible containing tanks in side by side spaced relation as the two containers or tanks are spaced within the housing.

The tank-like housing is hermetically sealed except for an opening at its top center through which the consumable electrode is downwardly fed into the crucible which at the time is positioned immediately below the same and therefore at the center of the housing.

Hydraulic means secured to the spacing frame top has its lower end secured to the movable tank support so that the tanks and their crucibles can be raised and lowered within the spacing frame. A second hydraulic device is capable of shifting the spacing frame and the tank support horizontally within the housing. The housing on opposite sides of its top central opening is provided with covers which seal side openings through which the crucible which is then the side crucible can be removed from the housing at a suitable time in the cycle of operation of the method of this invention.

Now referring to the drawings, the crucibles 20 and 21 are preferably hollow heavy copper cylinders having removable bottoms 22—22 and outwardly extending top flanges 23—23. Each crucible 20 or 21, as the case may be, is supported within a vertically extending open top cylindrical tank 24 by means of its flange 23 which rests on top of an annular angle member 25 secured to the top of the tank side wall. Each tank 24 is provided with an outwardly extending flange 26 at its top and this flange is provided with an annular packing member 27 which is secured to flange 26 adjacent its outer periphery. Flange 23 of each crucible carries a packing member 28.

Figure 4:
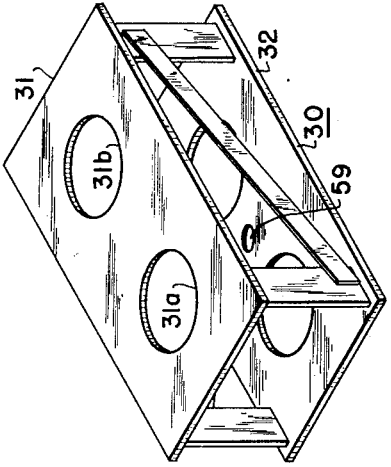
Fig. 4 is an isometric perspective view on a reduced scale of a spacing frame used in the make-up of the apparatus or device of Figs. 1 and 2.

Tanks 24—24 are mounted on and preferably secured to a support member 29 and are held in spaced relation by means of a spacing frame which as an entirety is numbered 30 and comprises upper and lower horizontally positioned members respectively numbered 31 and 32. Each of these members is provided with a pair of circular openings (see Fig. 4). The openings in member 31 are numbered 31a and 31b and are aligned with corresponding openings in lower member 32. These openings are of such diameter as to provide an easy sliding fit with the outer surface of tanks 24.

Figure 6:
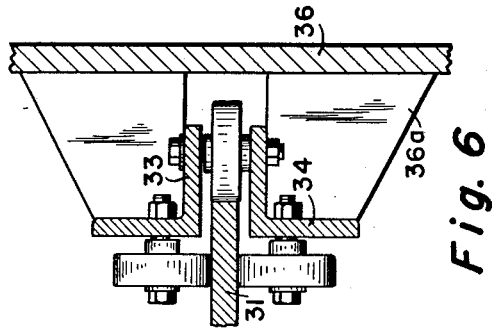
Fig. 6 is a view taken on line VI—VI of Fig. 5.
Figure 5:
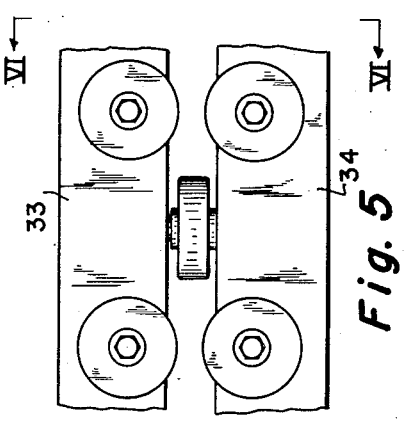
Fig. 5 is an enlarged detail view of part of the device of Figs. 1 and 2.

Upper member 31 of the spacing frame 30 is mounted for horizontal movement between clusters of rollers, the mounting spindles of which are secured within openings in the vertical and horizontal portions of angle members 33 and 34 (Figs. 2, 5 and 6) which preferably extend throughout the length of side walls 35 and 36 of the tank-like housing to which they are secured by brackets 35a and 36a spaced at regular intervals throughout the length of such housing side walls.

The housing end walls are numbered 37 and 38 and the floor or bottom member 39. These walls are provided with outwardly extending flanges at their upper edges as shown in Figs. 1 and 2 and top member 40 of the housing is secured to said flanges by bolts 41; a packing 42 being positioned between top member 40 and said flanges for sealing the joint between the top member and such flanges.

Figure 7:
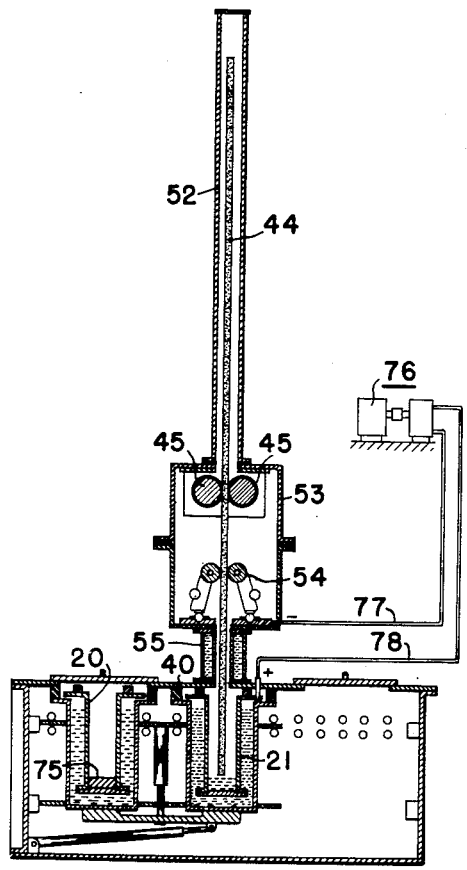

Top member 40 at its center is provided with an opening 43 through which the consumable electrode 44 is adapted to be fed downwardly by suitable feed rolls diagrammatically disclosed at 45 (Fig. 7). On opposite sides of central opening 43, top member 40 is provided with openings 46 and 47; each being of a diameter such that crucible 20 or 21 with its upper outwardly extending flange 23 can be readily raised or lowered therethrough.

Openings 46 and 47 are preferably circular, and are closed and sealed by means of cover members 48 and packing elements 49. These cover members are removably secured in place by threaded fastener means 50 disclosed in the drawings as wing nuts. Each cover 48 is provided with a valved member 51 for connection to an air pump for exhausting air from the container-like housing and/or for connecting it to a source of supply of inert gas such as argon gas or helium with which to flood the same.

From an inspection of Fig. 7, it will be noted that electrode 44 is enclosed within a hermetically sealed housing part 52 secured to a housing part 53 which houses feed rolls 45 and current carrying contact rolls 54. Housing part 53 is supported by and spaced from housing top 40 by a water cooled sleeve-like member 55 all preferably as disclosed in my said application Ser. No. 211,887.

Figure 9:
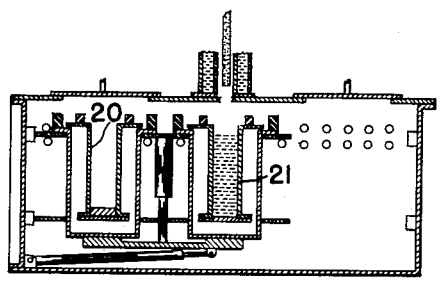
Figure 10:
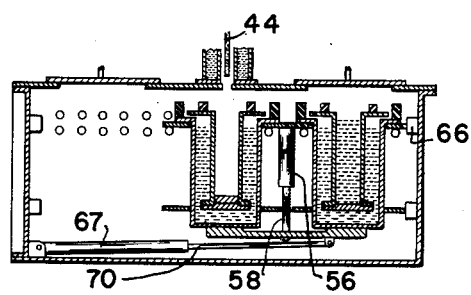
Figure 14:
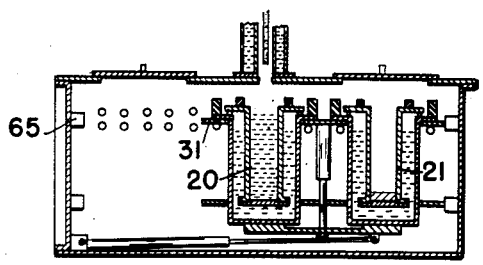

The cylinder 56 of an extendable hydraulic device is secured as at 57 to upper member 31 of the spacing frame midway between crucible containers 24—24. The piston rod 58 of such device extends through an opening 59 formed in the lower horizontal member of the spacing frame and is secured as at 60 to support member 29 preferably midway between its ends. Lifting of support member 29 to the position shown in Fig. 1 where the sealing member 28 of crucible 21 is held in sealing engagement with the under surface of top member 40 of the container-like housing is occasioned by the admission of hydraulic fluid through line 61 under the control of one portion of valve device 62 while the lowering of support member 29 to the position shown in Figs. 9, 10 and 14 is controlled by hydraulic fluid passing through line 63 controlled by another portion of the same valve device 62; the operation of such valve device being controlled by handle 64. Lines 61 and 63 have at least portions thereof formed of flexible tubing for permitting horizontal movement of the spacing frame and support member 29 from one stop 65 to the opposite stop 66. These stops are so positioned with relation to the length of the spacing frame that when upper member 31 of such frame contacts with stop 65, crucible 21 will be immediately below central opening 43 in the top member 40 of the container-like housing and when upper member 31 contacts with stop 66, crucible 20 will be immediately under said central opening 43.

Cylinder 67 of a second hydraulic device which has one end pivotally connected as at 68 to a mounting block 69 secured to floor 39 of the housing, has the outer end of its piston rod 70 pivotally secured as at 71 to support member 29. This second hydraulic device is operated by hydraulic fluid flowing through lines 72 and 73 under the control of a valve device 74. The second hydraulic device is shown contracted in Figs. 1, 7, 8, 9, 15 and 16 and extended in Figs. 10, 11, 12, 13 and 14. At least portions of lines 72 and 73 are also preferably formed of flexible tubing in order to accommodate tilting movement of cylinder 67.

A starting piece 75 of metal such as that of the ingots to be produced is positioned in the bottom of each crucible before such crucible is lowered into position within the container it is to occupy during the ingot forming and cooling steps of the method of this invention.

Figs. 7-16 inclusive depict certain steps comprised in my preferred cycle of operation. In Fig. 7, which corresponds to Fig. 1, both crucibles are empty except for the starting pieces 75, both are in raised position with the crucible 21 sealed to the top of the container-like housing; it being assumed that the housing has been evacuated or exhausted (this includes electrode tube or housing 52, housing parts 53 and 55) and then flooded with an inert gas such as argon or helium. Electrode 44 has been lowered to position within crucible 21 by rolls 45; it being assumed that current for the electric arc between the lower end of electrode 44 and starting piece 75 is being supplied from motor generator set 76 through lines 77 and 78, one line 77 connecting with connecting rolls 54 and line 78 connecting with crucible 21 and therefore starting piece 75 within such crucible.

Figure 8:
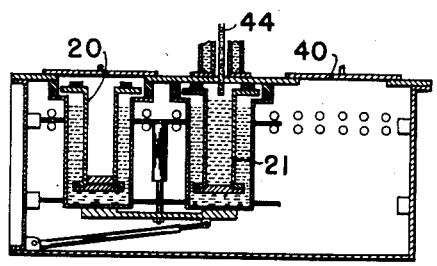

Fig. 8 shows crucible 21 filled with metal derived from consumable electrode 44. The crucible assembly is now ready to be moved to the position shown in Fig. 11 where crucible 20 is sealed to the inner surface of housing top 40 surrounding central electrode opening 43.

Figure 11:
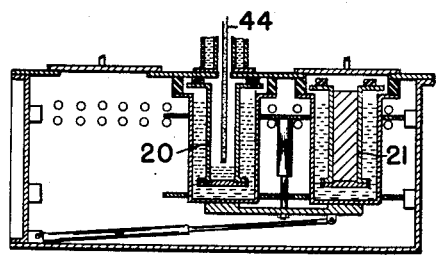

Before this (Fig. 11) position is reached, the crucible assembly must be lowered as shown in Fig. 9, then shifted horizontally until upper member 31 of the spacing frame contacts stop 66. The assembly is then raised to position as shown in Fig. 11. Raising and lowering of the assembly is accomplished by the first hydraulic device comprising cylinder 56 and piston rod 58, while horizontal shifting is accomplished by the second hydraulic device comprising cylinder 67 and piston rod 70.

While the lowering and shifting are taking place, the electric current is preferably cut off and feed rolls 45 are stopped. Lowering, shifting and raising of the crucible assembly as will be noted all take place without opening either of cover members 48 and while both crucibles are surrounded by the inert atmosphere within the housing.

Building up an ingot by melting down electrode 44 within crucible 20 now begins and proceeds until the ingot within crucible 21 is cooled to a temperature such that it can be exposed to the outside atmosphere without harmful effect. At this time, the sealing cover 48 above the cooled crucible is removed and such crucible is lifted out of its container 24 and replaced by an empty crucible containing starting piece 75.

Sealing cover 48 is then replaced; the container for crucible 21 having been sealed to the under face of top member 40 of the housing surrounding opening 46 prior to and during exchange of crucibles prevents any loss of the inert gas atmosphere from the container-like housing except the relatively small amount that was in the container above crucible 21 which was lost by removing sealing cover 48.

After sealing cover 48 is replaced over new crucible 21, the space between it (new crucible 21) and sealing cover 48 above such crucible is again evacuated and flooded with inert gas through connection 51.

Figure 13:
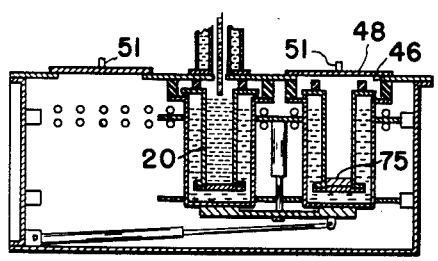

During exchange of crucibles, the removal and replacement of sealing cover 48 and the evacuation and flooding of the new crucible 21, melting continues in crucible 20 until such crucible is filled, see Fig. 13. As soon as crucible 20 is filled, the crucible assembly is lowered and shifted to the left until upper horizontal member 31 of the spacing frame contacts stop 65, thus locating a new empty crucible 21 immediately below electrode opening 43 at which time the crucible assembly will be raised to the position shown in Fig. 15 where new crucible 21 is sealed to top member 40 of the housing surrounding electrode opening 43. Current will then be turned on and electrode 44 lowered by rolls 45 and melting within new crucible 21 will begin and will continue until the ingot within crucible 20 has cooled to a temperature at which it will not be harmfully affected by atmospheric air. When this point is reached, the sealing cover 48 above crucible 20 will be removed and crucible 20 will be replaced by an empty new crucible 20 and the cycle repeated.

The water inlet 79 and overflow outlet 80 of the right-hand tank 24 are under the control of a valve device 81. The pipes between this valve device and said inlet and overflow outlet are necessarily flexible at least in part. That running from overflow outlet 80 to valve device 81 is preferably open at all times during operation of the device.

The water inlet of the left-hand tank 24 is numbered 82 and the overflow outlet for said tank is numbered 83. Inlet 82 and overflow outlet 83 are under the control of a valve device 84. Overflow outlet 83, like overflow outlet 80 is preferably open at all times during operation of the device and the pipes between valve device 84 and inlet 82 and overflow outlet 83 are also necessarily flexible at least in part.

Figure 12:
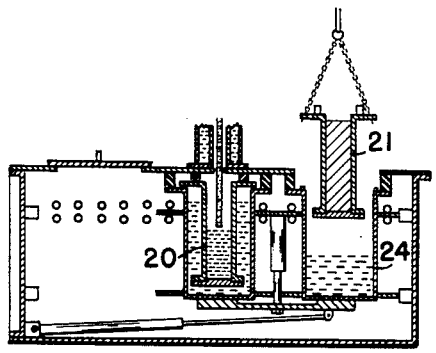
Figure 15:
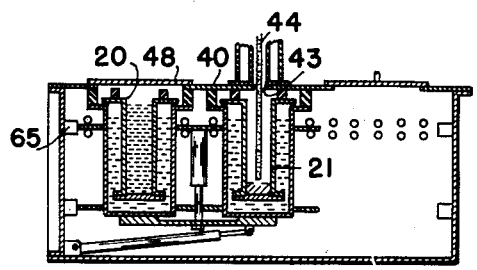
Figure 16:
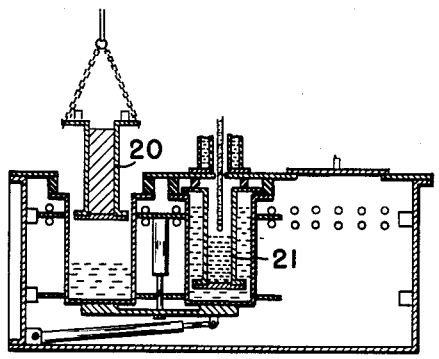

When a crucible is being removed from the chamber of the device, as depicted in Figs. 12 and 16, the valve device 81 or 84, as the case may be, is operated to close the inlet valve to its tank 24 in order to have a low level of cooling water in the tank or container 24 as depicted in said Figs. 12 and 16 when an empty crucible is lowered into said tank or container, after removal of the crucible with the cooled ingot therein.

What I claim is:

1. In the making of ingots of titanium or other difficultly reducible metal in water-cooled crucibles from a vertically movable consumable electrode of such metal material in a vacuum or atmosphere of inert gas, the steps which comprise providing within a container having two water cooled crucibles located therein an atmosphere which is not harmful to such metal when molten, electric arc melting within one such crucible material from such electrode until such crucible is substantially filled with such metal, moving both crucibles sidewise until the empty crucible is beneath such electrode, electric arc melting within such second crucible material from such consumable electrode until the metal within said first crucible is solidified and cooled to a temperature such that it will not be harmfully affected by exposure to atmospheric air, then opening such first container to the atmosphere while the other crucible and its container remain sealed from the atmosphere, removing from such container such first crucible and replacing the same by an empty crucible, then sealing such empty crucible and its container from the ambient atmosphere, exhausting such empty crucible and providing an atmosphere within the same which is inert to such metal when molten, continuing the filling of such second crucible with molten material from such consumable electrode and when such second crucible is substantially filled with such metal, in moving both crucibles sidewise in the opposite direction from the first sidewise movement until the empty crucible is below such electrode, then in repeating the cycle of operations above outlined.

2. A method as defined in claim 1, in which the crucibles and their containers are lowered between sidewise movements.

3. A method as defined in claim 1, in which the crucibles and their containers are lowered preparatory to moving sidewise.

4. A method as defined in claim 1, in which the crucibles and their containers are lowered prior to being moved sidewise and then raised prior to opening the cooled crucible to the atmosphere.

5. In mechanism for use in the making of ingots of titanium or other difficultly reducible metals, the combination of two open top crucible containers arranged in side by side spaced relation and resting on a common support member, a crucible located within each such container, a spacing frame comprising upper and lower horizontal members provided with aligned openings within which said crucible containers are positioned for vertical movement with relation to such spacing frame, a generally rectangular container-like housing within which said spacing frame is mounted for horizontal movement, extendible power operated means having a portion thereof secured to the upper horizontal member of said spacing frame and another portion secured to such support member for raising and lowering such support member together with said crucibles and their containers; the top of said housing being provided at its center with an opening through which a consumable electrode is adapted to be fed downwardly into the crucible then located thereunder, said housing top on opposite sides of said central opening being provided with an opening of sufficient size to permit passage of one such crucible therethrough, cover means for hermetically sealing each such side opening, a valved connection extending through each such cover for use in exhausting and flooding such housing with a suitable inert gas, and extendible power operated means for moving such spacing frame and such support member horizontally to place one or the other of said crucibles below said central opening.

6. A structure as defined in claim 5, in which the crucible containers are provided with cooling water inlets and outlets.

7. A structure as defined in claim 5, in which each of the crucible containers at its top is provided with an outwardly extending horizontal flange and each crucible is provided with an outwardly extending horizontal flange which overlies the flange of its container.

8. A structure as defined in claim 5, in which the upper horizontal member of the spacing frame is supported on clusters of rollers.

9. A structure as defined in claim 8, in which the clusters of rollers are arranged at spaced intervals on opposite sides of the container-like housing.

10. A structure as defined in claim 8, in which each cluster of rollers comprises two rollers which revolve about horizontal axes and one which revolves about a vertical axis.

11. A structure as defined in claim 5, in which each of the extensible power operated means is hydraulically operated.

RAYMOND L. SOUTHERN.

References Cited in the file of this patent

UNITED STATES PATENTS

| Number | Name | Date |
| --- | --- | --- |
| Re. 13,849 | Simpson | Dec. 15, 1914 |
| 457,879 | Madden | Aug. 18, 1891 |
| 704,993 | Weber | July 15, 1902 |
| 819,883 | Hewlett et al. | May 8, 1906 |
| 980,345 | Ruthenburg | Jan. 3, 1911 |
| 1,866,538 | Andrus | July 12, 1932 |
| 2,089,030 | Kratky | Aug. 3, 1937 |
| 2,558,744 | Fouquet | July 3, 1951 |

OTHER REFERENCES

Publication, "Metal Progress," Feb. 1949, p. 195.